United States Patent
Marmor et al.

(10) Patent No.: US 10,146,826 B1
(45) Date of Patent: Dec. 4, 2018

(54) STORAGE ARRAY TESTING

(71) Applicant: EMC Corporation, Hopkinton, MA (US)

(72) Inventors: Erez Marmor, Tel Aviv (IL); Ilan Yosef, Petah-Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 318 days.

(21) Appl. No.: 14/980,023

(22) Filed: Dec. 28, 2015

(51) Int. Cl.
*G06F 17/30* (2006.01)

(52) U.S. Cl.
CPC .. *G06F 17/30371* (2013.01); *G06F 17/30598* (2013.01)

(58) Field of Classification Search
CPC ................................................ G06F 17/30371
See application file for complete search history.

(56) References Cited

U.S. PATENT DOCUMENTS

2015/0269050 A1* 9/2015 Filimonov .......... G06F 11/3409
702/183

* cited by examiner

*Primary Examiner* — Syed H Hasan
(74) *Attorney, Agent, or Firm* — Daly, Crowley Mofford & Durkee, LLP

(57) ABSTRACT

In one aspect, a method includes receiving samples of data generated from a storage array related to a performance parameter; determining, for each sample, whether a sample is anomaly; and determining, for each sample identified as an anomaly, whether the anomaly should be reclassified to a spike or a drop.

16 Claims, 2 Drawing Sheets

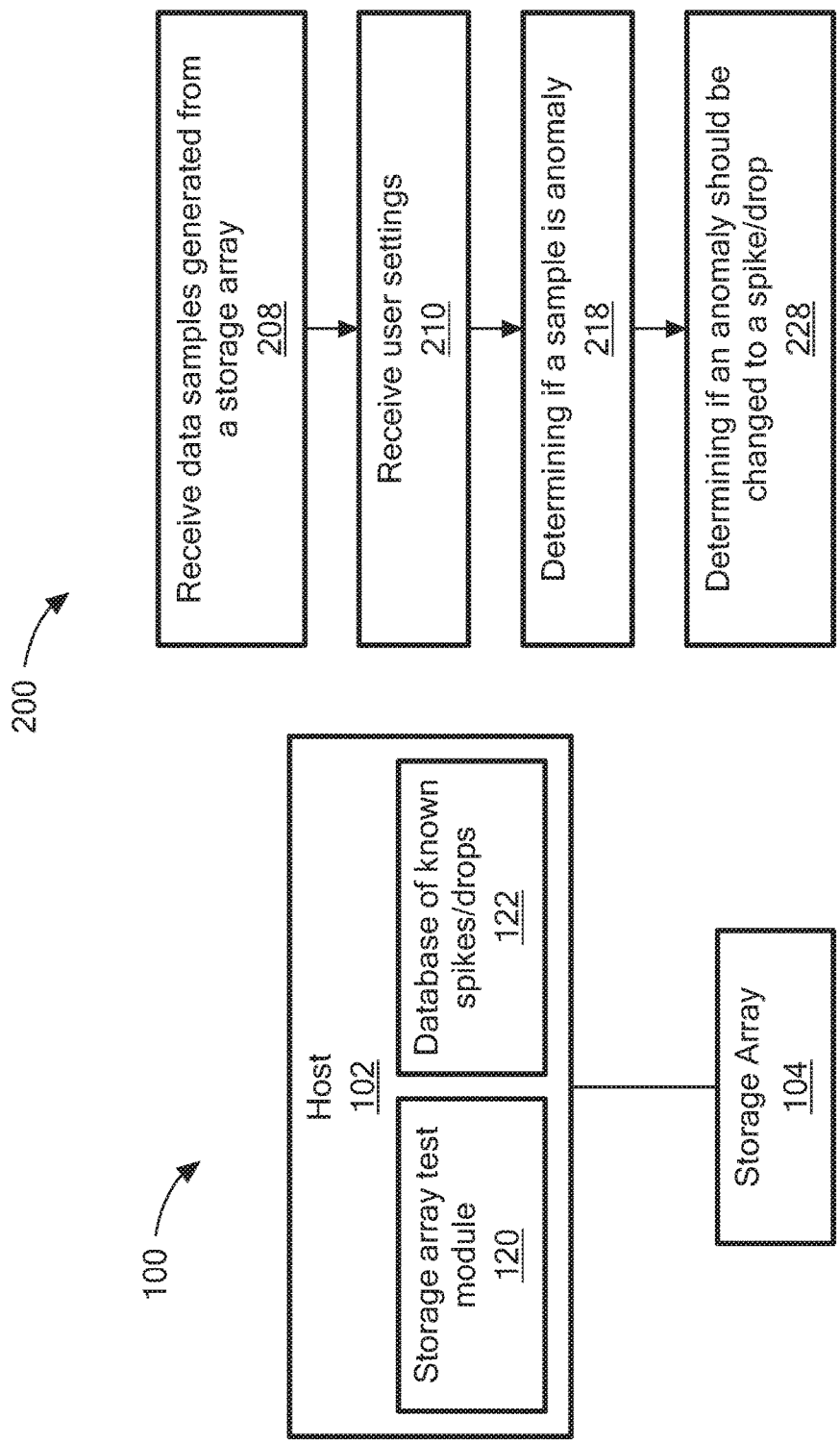

STORAGE ARRAY TESTING

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by generating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

Most of the modern storage arrays provide snapshot capabilities. These snapshots allow a user to save a freeze an image of a volume or set of volumes at some point in time and to restore this image when needed.

SUMMARY

In one aspect, a method includes receiving samples of data generated from a storage array related to a performance parameter; determining, for each sample, whether a sample is anomaly; and determining, for each sample identified as an anomaly, whether the anomaly should be reclassified to a spike or a drop.

In another aspect, an apparatus includes electronic hardware circuitry configured to receive samples of data generated from a storage array related to a performance parameter, determine, for each sample, whether a sample is anomaly and determine, for each sample identified as an anomaly, whether the anomaly should be reclassified to a spike or a drop.

In a further aspect, an article includes a non-transitory computer-readable medium that stores computer-executable instructions. The instructions causes a machine to receive samples of data generated from a storage array related to a performance parameter, determine, for each sample, whether a sample is anomaly and determine, for each sample identified as an anomaly, whether the anomaly should be reclassified to a spike or a drop.

BRIEF DESCRIPTION OF THE DRAWINGS

FIG. 1 is a block diagram of an example of a system to test a storage array, according to one embodiment of the disclosure.

FIG. 2 is a flowchart of an example of a process to test a storage array, according to one embodiment of the disclosure.

DETAILED DESCRIPTION

Figure 3:
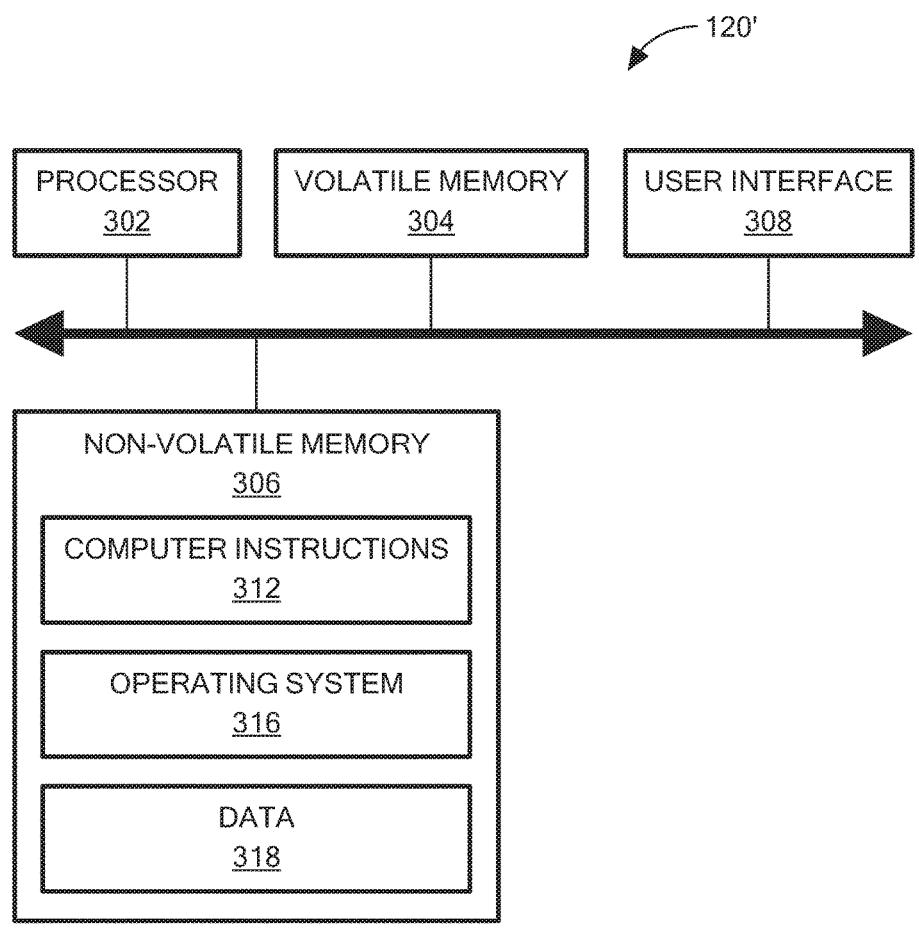
FIG. 3 is a block diagram of an example of a computer on which any portion of the processes of FIG. 2 may be implemented, according to one embodiment of the disclosure.

Referring to FIG. 1, a system 100 is an example of a system to test a storage array, according to one embodiment of the disclosure. The system 100 includes a host 102 and a storage array. The host 102 includes a storage array test module 120 used to test the performance of the storage array 104. The host also includes a database of known drops/spikes 122 in the storage array 104. In one particular embodiment, the database of known drops/spikes 122 may be used to compare a current anomaly to past "expected" anomalies (based on test step/system state). In one example, the storage array test module 120 using the database of known drops/spikes 122 identifies spikes or drops in storage array performance data. In one particular example, the storage array test module 120 identifies I/O drops, bandwidth drops or latency spikes in the storage array 104.

In one example, the storage array 104 is flash storage array. In other examples, the storage array 104 is a deduplication device. In other examples, the storage array 104 may be part of a device used for scalable data storage and retrieval using content addressing. In one example, the storage array 104 may include one or more of the features of a device for scalable data storage and retrieval using content addressing described in U.S. Pat. No. 9,104,326, issued Aug. 11, 2015, entitled "SCALABLE BLOCK DATA STORAGE USING CONTENT ADDRESSING," which is assigned to the same assignee as this patent application and is incorporated herein in its entirety. In other examples, the storage array 104 is a flash storage array used in EMC® EXTREMEIO®.

Referring to FIG. 2, a process 200 is an example of a process to test a storage array, according to one embodiment of the disclosure. Process 200 receives data samples generated from a storage array (208). For example, the storage array test module 120 receives data related to a performance parameter. For example, samples of data are received. In one example, the performance parameter is I/O per second. In another example, the performance parameter is latency. In a further example, the performance parameter is bandwidth. In one example, the samples are received in real time. In another example, the samples are received after all the data has been collected.

Process 200 receives user settings (210). For example, the user may select a setting to use. In one example, the user settings include an error rate value. In another example the user settings include the value m, which is used to determine whether a sample classified as an anomaly should be now changed to be classified as a spike/drop. In other embodiments, default settings are used instead. In one particular example, the user may adjust the default settings.

Process 200 determines whether a sample is an anomaly or not (218). For example, the storage array test module 120 determines, for each sample, whether:

$$\text{distance} < (\text{standard deviation}) * (\text{error rate}),$$

where standard deviation is the standard deviation of the last n samples, n equals exact number of samples required to perform the calculation, distance equals abs(new Sample−last n samples' average). If the distance is not less than [(standard deviation)*(error rate)], then the sample is classified as an 'anomaly.'

Process 200 determines if a sample classified as anomaly should be reclassified as a drop/spike (228). For example, the sample is reclassified to a spike/drop if the sample is part of the m'th consecutive anomalies.

Referring to FIG. 3, in one example, a CDP module 120 is a CDP module 120', according to one embodiment of the disclosure. In one example, CDP module 120' includes a processor 302, a volatile memory 304, a non-volatile memory 306 (e.g., hard disk) and the user interface (UI) 308

(e.g., a graphical user interface, a mouse, a keyboard, a display, touch screen and so forth). The non-volatile memory 306 stores computer instructions 312, an operating system 316 and data 318. In one example, the computer instructions 312 are executed by the processor 302 out of volatile memory 304 to perform all or part of the processes described herein (e.g., process 200).

The processes described herein (e.g., process 200) are not limited to use with the hardware and software of FIG. 3; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 200 are not limited to the specific processing order of FIG. 2. Rather, any of the processing blocks of FIG. 2 may be re-ordered, combined or removed, performed in parallel or in serial, as necessary, to achieve the results set forth above.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method of testing a storage array, the method comprising:
    receiving, at a test module of a host computer, samples of data generated from the storage array related to a performance parameter;
    determining, for each sample, whether a sample is anomaly, the determining comprising classifying the sample as an anomaly if distance is not less than a product of a standard deviation of the last n samples and an error rate; and
    determining, for each sample identified as an anomaly, whether the anomaly should be reclassified to a spike or a drop;
    wherein:
    the distance is equal to the absolute value of the difference of a new sample and an average of the last n samples;
    the standard deviation is the standard deviation of the last n samples; and
    n equals a specified number of samples to perform a calculation to determine whether a sample is an anomaly.

2. The method of claim 1, wherein determining, for each sample identified as an anomaly, whether the anomaly should be reclassified to a spike or a drop comprises reclassifying an anomaly as a drop or spike if the sample is part of the m'th consecutive anomalies.

3. The method of claim 1, further comprising receiving user settings comprising the error rate.

4. The method of claim 1, wherein receiving samples of data generated from a storage array related to a performance parameter comprises receiving samples of data generated from a storage array related to I/Os per second.

5. The method of claim 1, further comprising receiving user settings comprising a value of m, wherein the value of m is a user-tunable parameter.

6. The method of claim 1, wherein the error rate and a value of m are default settings.

7. The method of claim 1, wherein receiving samples of data generated from a storage array related to a performance parameter comprises receiving samples of data generated from a storage array related to one of bandwidth and latency.

8. An apparatus for testing a storage array, the apparatus comprising:
    electronic hardware circuitry configured to:
        receive, at a test module of a host computer, samples of data generated from the storage array related to a performance parameter;
        determine, for each sample, whether a sample is anomaly by classifying the sample as an anomaly if distance is not less than a product of a standard deviation of the last n samples and an error rate; and
        determine, for each sample identified as an anomaly, whether the anomaly should be reclassified to a spike or a drop;
    wherein:

the distance is equal to the absolute value of the difference of a new sample and an average of the last n samples;

the standard deviation is the standard deviation of the last n samples; and n equals a specified number of samples to perform a calculation to determine whether a sample is an anomaly.

9. The apparatus of claim 8, wherein the circuitry comprises at least one of a processor, a memory, a programmable logic device or a logic gate.

10. The apparatus of claim 8, wherein the circuitry configured to determine, for each sample identified as an anomaly, whether the anomaly should be reclassified to a spike or a drop comprises circuitry configured to reclassify an anomaly as a drop or spike if the sample is part of the m'th consecutive anomalies.

11. The apparatus of claim 8, further comprising circuitry configured to receive user settings comprising the error rate.

12. The apparatus of claim 8, wherein the circuitry configured to receive samples of data generated from a storage array related to a performance parameter comprises circuitry configured to receive samples of data generated from a storage array related to one of I/Os per second, bandwidth or latency.

13. An article for testing a storage array, the article comprising:

a non-transitory computer-readable medium that stores computer-executable instructions, the instructions causing a machine to:

receive, at a test module of a host computer, samples of data generated from the storage array related to a performance parameter;

determine, for each sample, whether a sample is anomaly by classifying the sample as an anomaly if distance is not less than a product of a standard deviation of the last n samples and an error rate; and determine, for each sample identified as an anomaly, whether the anomaly should be reclassified to a spike or a drop;

wherein:

the distance is equal to the absolute value of the difference of a new sample and an average of the last n samples;

the standard deviation is the standard deviation of the last n samples; and n equals a specified number of samples to perform a calculation to determine whether a sample is an anomaly.

14. The article of claim 13, wherein the instructions causing the machine to determine, for each sample identified as an anomaly, whether the anomaly should be reclassified to a spike or a drop comprises instructions causing the machine to reclassify an anomaly as a drop or spike if the sample is part of the m'th consecutive anomalies.

15. The article of claim 13, further comprising instructions causing the machine to receive user settings comprising the error rate.

16. The article of claim 13, wherein the instructions causing the machine to receive samples of data generated from a storage array related to a performance parameter comprises instructions causing the machine to receive samples of data generated from a storage array related to one of I/Os per second, bandwidth or latency.

* * * * *